United States Patent [19]

Lindner et al.

[11] Patent Number: 5,568,724
[45] Date of Patent: Oct. 29, 1996

[54] TURBOFAN ENGINE WITH MEANS TO SMOOTH INTAKE AIR

[75] Inventors: Ernst Lindner, Tübingen; Guido W. Trittler, Unterschleissheim; Klaus Britz, Olching, all of Germany

[73] Assignee: MTU Motoren-und Turbinen Union München GmbH, München, Germany

[21] Appl. No.: 211,798

[22] PCT Filed: Oct. 1, 1992

[86] PCT No.: PCT/EP92/02274

§ 371 Date: Jun. 27, 1994

§ 102(e) Date: Jun. 27, 1994

[87] PCT Pub. No.: WO93/08397

PCT Pub. Date: Apr. 29, 1993

[30] Foreign Application Priority Data

Oct. 15, 1991 [DE] Germany .................. 41 34 051.5

[51] Int. Cl.⁶ .................................................. F02K 1/64
[52] U.S. Cl. ........................... 60/204; 60/226.2; 415/914
[58] Field of Search ............................ 60/204, 226.1, 60/226.2, 262, 269; 187/15.1; 244/53 B; 415/914

[56] References Cited

U.S. PATENT DOCUMENTS

| | | | |
|---|---|---|---|
| 3,468,473 | 9/1969 | Davies | 230/114 |
| 3,474,813 | 10/1969 | Servanty | 137/81.5 |
| 3,476,486 | 11/1969 | Davies | 415/68 |
| 3,487,880 | 6/1970 | Davies | 416/157 |
| 3,489,338 | 1/1970 | Chilman | 230/114 |
| 3,528,752 | 9/1970 | Davies | 415/130 |
| 3,603,094 | 9/1971 | Townend | 60/261 |
| 3,729,934 | 5/1973 | Denning | 60/226 R |
| 3,770,228 | 11/1973 | Traksel | 137/15.1 |
| 3,931,708 | 1/1976 | Motycka | 60/226 A |
| 4,047,381 | 9/1977 | Smith | 60/226.2 |
| 4,749,151 | 6/1988 | Ball et al. | 244/53 B |
| 4,865,628 | 9/1989 | Tracksdorf . | |
| 5,090,196 | 2/1992 | Balzer . | |

FOREIGN PATENT DOCUMENTS 1463771 12/1966 France .
1565212 4/1980 United Kingdom .

Primary Examiner—Louis J. Casaregola
Attorney, Agent, or Firm—Ladas & Parry

[57] ABSTRACT

A turbojet fan engine is disclosed having a fan or prop fan which blows air into a secondary channel and an external shroud for the turbine and the secondary channel, in which the front end of the shroud is formed with an inlet lip and the rear end of the shroud is formed in a nozzle-like, pointed manner and at least one end of the shroud is changed, with respect to its effective profile geometry, by means of air under pressure which is taken from the engine and blown out at the appropriate end of the shroud.

22 Claims, 4 Drawing Sheets

TURBOFAN ENGINE WITH MEANS TO SMOOTH INTAKE AIR

FIELD OF THE INVENTION

The invention relates to a turbojet engine having a fan and an external shroud defining a secondary flow channel containing the fan, the front end of the shroud being formed with an inlet lip and the trailing end of the shroud being formed in a nozzle-like pointed manner and wherein the flow of ambient air into the secondary channel is capable of being controlled at least at one of the ends of the shroud.

BACKGROUND AND PRIOR ART

A particular turbojet engine for subsonic flight propulsion is disclosed in DE-OS 3720318 in which the shroud of the engine, which surrounds the turbine, has an inlet lip which is capable of being deformed mechanically by means of pairs of flaps which are distributed over the periphery. In this way, the shroud of the engine is said to be capable of being configured with a relatively slender aspect which is optimum in terms of fuel consumption and which is usually used for normal flight operation; nevertheless, critical conditions exist in the engine, e.g. during the starting phase (standing on the ground with the engine at full power) at which there is pronounced turbulent flow at the internal wall of the shroud at the lip (causing deficient and aerodynamically disturbed supply of air to the engine) and these conditions are said to be capable of being satisfied. In addition to an appropriate localized thickening of the walls of the inlet lip, the aforesaid pairs of flaps are said to provide channels through which outside air is forcibly blown in or out. The arrangement of flaps in the disclosed embodiment requires comparatively high construction and manufacturing costs. In addition to a peripheral arrangement of baffles, which is required, the flaps lead to a considerable increase in weight. An automatic static differential pressure control of the pairs of flaps is provided in the disclosed embodiment which has the disadvantage, among others, of giving rise to response characteristics which are relatively sluggish, in time, during critical stages of operation, whereby, for example, compression pumping as a result of the critical state may not be capable of being stopped in a timely manner or, as the case may be, sufficiently spontaneously.

Jet propulsion engines which are exclusively provided for subsonic flight operation with shrouded front fans or front propellers (prop fans) are also known (U.S. Pat. No. 3,931,708) in which reverse thrust or, as the case may be, a thrust reversal operation is produced, together with an appropriate negative positioning of the fan blades, to supply the fan and engine with intake air from the outside via the normally extremely thin-walled end of the shroud to be compressed to produce reverse thrust by a secondary mass flow towards the lip at the front or leading edge of the shroud. The trailing or rear edge of the shroud, normally the outlet end during forward thrust is provided with flaps which can be pivoted around axes of rotation which extend transversely with respect to the axis of the engine whereby normally the flaps form a trailing edge of the shroud, which is aerodynamically relatively slender with a gently convergent/divergent nozzle contour in the fully retracted position (in the case of normal horizontal flight); as regards the thrust reversal operation, the flaps are extended in a "spoiler-like" manner in order to provide a bell-shaped contour and hence to provide a supply of intake air to the fan via the local nozzle-like trailing edge of the shroud which is as free as possible of air turbulence from the shroud and which is uniform over its periphery.

SUMMARY OF THE INVENTION

An object of the invention is to provide an engine of the type disclosed in the art in which the front and/or rear wall geometry of the shroud is capable of being influenced at comparatively low cost in terms of construction and weight, in correspondence with certain critical operating requirements in regard to turbulent-free air supply to the fan and the basic turbo engine and which, at the same time, is capable of being configured in an extremely slender and optimum manner with respect to fuel consumption and which is consistent with the aerodynamic requirements during the normal flight mode of operation.

The above object is achieved in accordance with the invention by providing means at least at one of said ends of the shroud for diverting from ambient air flow on an outside surface of said shroud at said at least one end to produce thereat a partial intake air flow into the shroud to achieve a substantially smooth, non-turbulent flow of said ambient air into said shroud.

In accordance with the invention, one can dispense with the use of flaps and the means for activating thereof or, as the case may be, the means for adjusting them, e.g. in connection with the radially external rounding and thickening of the shroud end in question. This is extremely advantageous, for example, in the thrust reversal mode of operation which has been described in which rearward induction of fan air is effected at the trailing edge of the shroud; in this connection, the nozzle-like trailing edge can, in principle, remain configured, as in the past, in an aerodynamically slender and thin walled manner with a pointed end suitable for normal flight mode of operation which occurs most of the time. During thrust reversal, at least one radially external coaxial turbulent field at the trailing edge can be produced, purely aerodynamically, with respect to the flow of the surrounding air and the flow of air which is being suctionally inducted; the inducted air is substantially free from total pressure losses and can be deflected around this turbulent field and conducted in a uniformly distributed manner over the periphery of the shroud to the fan and, to a lesser extent, to the basic turbo engine (the compressor thereof). In this connection, openings, channels or similar arrangements can also be provided in the interior of, for example, the trailing edge of the shroud facing the nozzle passage, for the supply of air under pressure so that, for example, a flow reversal zone is formed purely aerodynamically over the entire periphery of the trailing edge of the wall section of the shroud by at least one further, somewhat modulated turbulent zone which is formed in the interior of the nozzle-like trailing edge and which is virtually totally circular, or elliptical or tear drop-shaped in cross-section.

Appropriately pronounced turbulent fields can, for example, be produced by means of air under pressure, which is taken from the high pressure compressor of the basic engine in the form of aerodynamically perturbing elements or, as the case may be, "spoilers" and which circulate against the flow of air from the outside. Valves can be arranged in one or more supply lines for blowing air which, with the inclusion of possible thrust reversal modes of operation, are capable of being activated at the correct time as a function of any critical engine or flight condition, i.e., for example, with regard to compressor pumping which has already been described. The latter can be extremely advantageous for influencing the inlet lip at the front end in regard to the designated critical phases. In employing the invention for the designated thrust reversal mode of operation, phase displacement is advantageous which is of such a type that even the phase in which the fan blades are adjusted in the thrust reversal position, or shortly before that, the correspondingly required blowing out of air takes place at the rear of the shroud. The latter is also a subject of the invention.

For example, within the framework of the critical case which was mentioned earlier (starting phase, standing on the ground and with the engine at full power) the front end or, as the case may be, the inlet lip on the inside of the shroud can be thickened purely aerodynamically in order to counteract the danger of compression pumping due to a strongly perturbed flow by eliminating the relatively pronounced turbulent flow which results in this state. The feeding in of air under pressure can take place in regard to the factors of flow direction, flow quantity, pressure and velocity such that regions of turbulence which form upstream of the periphery of the wall of the shroud inside the lip are eliminated.

As has already been mentioned in accordance herewith, it is also possible to adapt, appropriately to the local conditions, the pressure, the quantity, the velocity and the direction of flow which is required in each case for the high pressure air which is introduced in the form of an artificial spoiler; in this respect, a local distribution is also possible which is uniform or non-uniform over the periphery, for example, through openings, slits or passageways which are capable of being selectively uncovered or closed off in the local internal wall or external wall of the shroud or, as the case may be, in air line elements or, feed elements which are capable of being displaced or rotated relative to one another. The invention includes exerting an influence on the shroud at the front end or, as the case may be, influencing the lip or exerting an influence at the rear of the shroud in the case of thrust reversal modes of operation within the context of a special rear lip construction as such or jointly in the case of a jet engine.

BRIEF DESCRIPTION OF THE FIGURES OF THE DRAWINGS

By way of example, the invention is further described with reference to the drawings, wherein.

DETAILED DESCRIPTION OF PREFERRED EMBODIMENTS

Figures 1, 2:
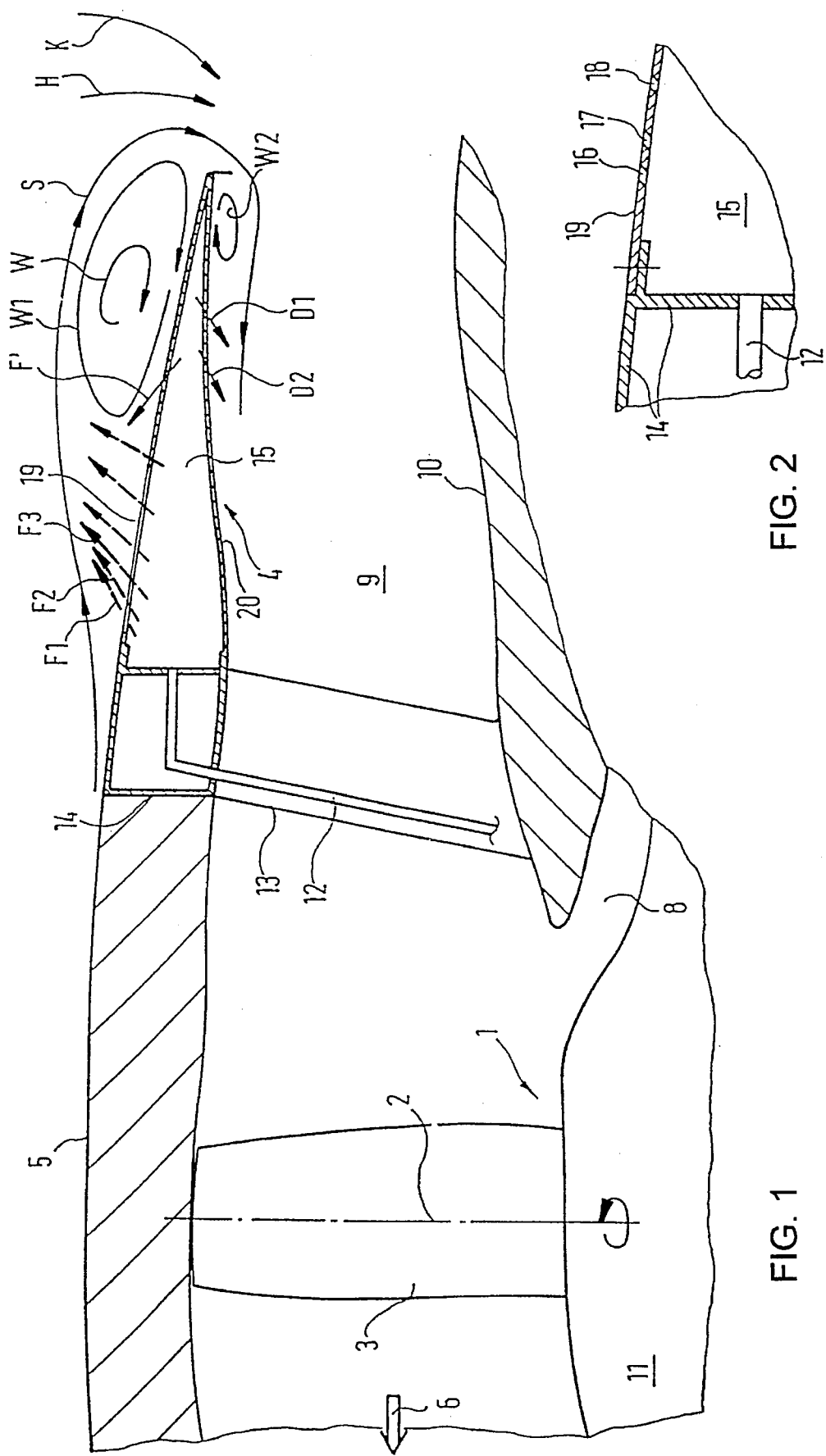
FIG. 1 shows an arrangement which is schematic and which is shown in section along the middle line of a front fan in the engine with purely aerodynamically optimized influence on the inlet stream at the rear end of the shroud for thrust reversal modes of operation.
FIG. 2 shows a detailed and enlarged section of the external wall of the rear end of the shroud which has been attached at the torque box in accordance with FIG. 1 as well as three sequential series of openings which are differently inclined for blowing air out.

FIG. 1 mainly illustrates the front fan 1, or, as the case may be, the prop fan, of a gas turbine jet engine with fan blades 3 which are adjustable around the axis of rotation 2 in accordance with the load characteristics and output characteristics which are required in each case. In addition to the positive positions for the production of forward propulsion thrust, the fan blades 3 are also capable of being rotated into such a negative pitch position that a thrust reversal operation is possible whereby the front fan 1 sucks in air from the outside in the region of the shroud end 4, which is upstream, of the shroud 5; in this way, the braking reversed thrust is supplied by the mass flow 6 which is discharged from the fan at the upstream end of the shroud; a portion of the air which is sucked at the rear by the engine flows into an annular channel 8 which is connected to the inlet of the basic turbo engine. In the normal case, the front fan 1 pumps predominantly into a secondary channel 9 of annular shape between the shroud 5 and a wall 10 of the basic engine. A part of the air supplied from the front fan 1 flows to the basic turbo engine via the annular channel 8. In the normal case (forward propulsion thrust), the open end 4 of shroud 5, which projects rearwardly as a pointed tip forms together with the radially adjacent section of the wall 10, a stationary annular secondary thrust nozzle for the mass flow which is supplied from the front fan 1.

A supply of air under pressure is provided, for example, on the outside of the wall and on the inside of the wall in FIG. 1, in order, at this location, to be able to configure the rear end 4 of the shroud for normal flight operation, which is the most used of all, in a slender pointed manner and one which is optimum in regard to fuel consumption despite the aerodynamic requirements of the thrust reversal operation which have been described; this takes place in accordance with the directions of the arrows F1, F2 (outside) and in accordance with the arrows D1, D2 (inside). The consequence of blowing air out at F1, F2 etc. makes possible the creation of a turbulent field W, W1, which circulates clockwise in an approximately rotationally symmetrical fashion with respect to the axis of the engine or with respect to the axis of the fan, at the outside of the end 4 of the shroud; the effect of blowing air out at D1, D2 can also generate a somewhat modulated turbulent zone W2 at the inside and intensify the suction induction effect at the rear; the effect of the turbulent field W, W1 can optionally be intensified by blowing air out at F' in a counter flow direction to the air blown out at F1, F2. Thus, the ambient air, which flows at or in the region of the periphery of the shroud 5 during reverse thrust operation can, as shown by the flow line S, flow, virtually without turbulence from the shroud in a gently rounded and respectively reversed flow direction around the pointed edge of the end 4 of the shroud, to the front fan 1. A similar state applies to the portions of air which are sucked in radially (arrow H) or, as the case may be, laterally at the rear (arrow K) in the case of thrust reversal modes of operation leading to an intake flow of air, by the blowing process which has been described, which is homogeneous, i.e. free from turbulence to the largest possible extent so that, in total, a supply of air is possible to the fan 1 during the thrust reversal operation which has extremely low total pressure losses.

The basic turbo engine which is not shown further in the drawings can consist, in sequence from left to right, of a multi-stage high pressure compressor, an annular combustion chamber and a drive turbine for the high pressure compressor; a low pressure turbine, which is coupled to the front fan by a shaft which passes through a hollow shaft system of the high pressure component, can be serially connected to the fan; furthermore, one or more additional compressor stages, which are drivingly connected with the shaft of the front fan 1, can be arranged in front of the high pressure compressor; a reduction gear unit can also be incorporated into the driving shaft connection between the low pressure system and the shaft of the front fan. The rotor blades 3 of the front fan 1 are arranged in an adjustable manner on a central element 11 on the side of the hub. The air which is blown out can, for example, be taken from the high pressure compressor and can then be fed through at least one discharge line 12; in the present case, this extends through one or more hollow support blades 13 which pass through the secondary channel 9; a discharge end of the discharge line 12 extends into a torque box 14 and projects in a radial direction into a chamber 15 in the end 4 of the shroud. Openings for blowing air out which have been mentioned and which correspond to the flow directions F1, F2, F3 (FIG. 1) are seen in FIG. 2 and are arranged here in the external wall 19 of the shroud end 4 and are designated 16, 17 and 18. The openings 16, 17 and 18 are, for example, in the form of drilled holes or slit-like passageways or similar shapes which are at a different inclination with respect to each other or, e.g. may be arranged so that they are at a progressively different inclination from the front inside to the top outside relative to the axis of the engine. In accordance with FIG. 2, the external wall 19 is rigidly connected to the torque box 14; the same applies, in this regard, to the connection of the internal wall 20 (FIG. 1).

The supply of air under pressure can also be controlled as a function of the conditions of the engine and/or the ambient surroundings by valves, for example, a check valve which is located in each discharge line 12. Openings in the external wall and/or the internal wall 19 and 20 of the end 4 of the shroud for blowing air can be formed by drilled holes, slits or similar arrangements or even by means of devices which are in the form of sieve holes, and combinations of the described opening configurations are also possible.

Figure 3:
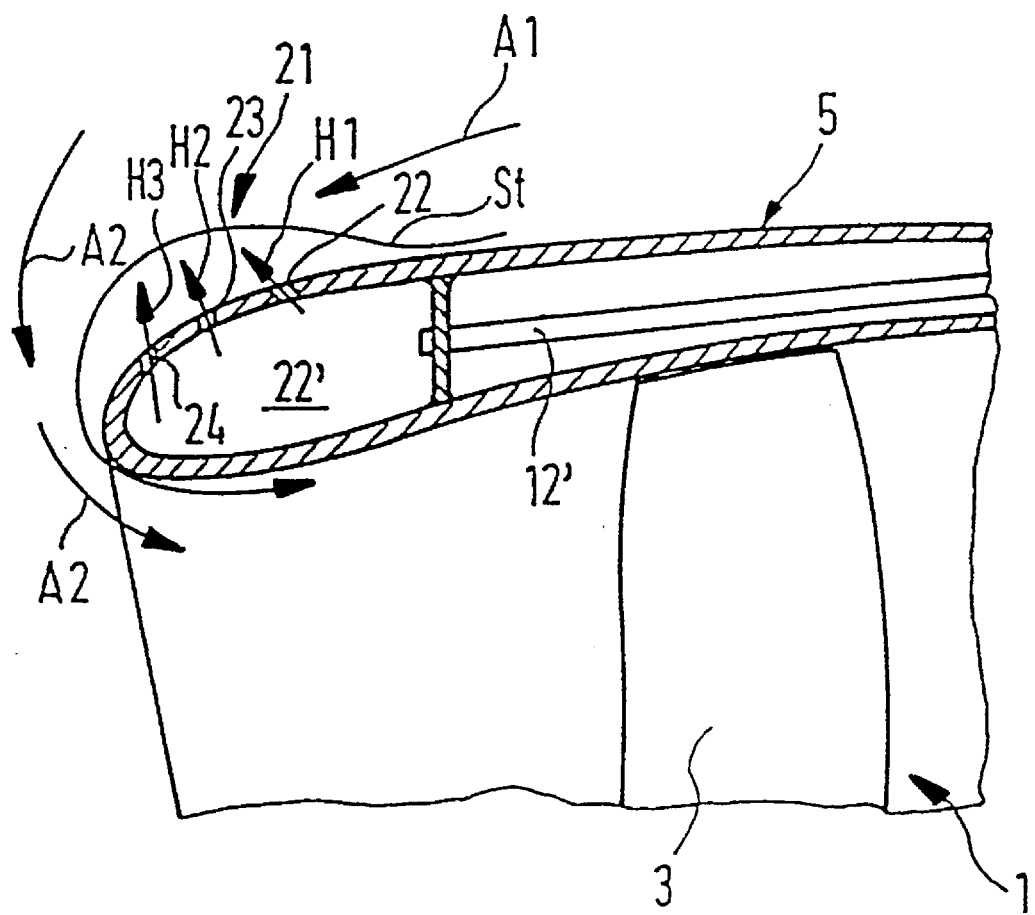
FIG. 3 shows a section along the middle line of the barrel-like turbine shroud at its front end and which forms the inlet lip together with local external openings for blowing out of air under pressure on the surface and a correspondingly optimized inlet flow in the standing state of the aircraft with the engine at full power.

Using identical reference numbers for essentially the same components, FIG. 3 incorporates provisions for blowing out air under pressure in order to optimize take-off of the aircraft, especially with the engine at full power. In this connection, the upstream or front end 21 of the barrel-like shroud 5 is illustrated in particular with an inlet lip having at least one chamber 22'; the discharge end of the discharge line 12', which is first led through a support blade 13 (FIG. 1) and then, in this case, in the direction of the front end 21, through the shroud 5, and then into the chamber 22'. In this way, air under pressure H1, H2, H2 is blown out, for example, through the openings 22, 23, 24; a thickened rounding of the air flow at the lip, which characterizes the flow path St, is created by a turbulent air cushion which is produced in this way. Hence, intake air for the front fan 1 flows over the entire periphery of the lip, as uniformly as possible, as free from turbulence as possible and as low in pressure losses as possible, especially with regard to the indicated flow directions from parts A1, A2 of intake air flowing towards the lip end from behind or respectively laterally from behind. In this way, which has been described by way of example, the front end 21 of the shroud can be configured using the aforesaid lip geometry in regard to the criteria of normal flight operation, i.e. slender, low in aerodynamic loss, light in weight and optimum in fuel consumption.

Additionally—or on their own—and in a manner which is not illustrated further, it is possible in accordance with the invention to provide openings at the interior of the lip of the front end 21 of the shroud such that separation of the air flow thereat is obviated. Such flow separations occur mainly on the inside surfaces of the periphery of the lip and shroud when the engine is under full load and shortly before take off of the aircraft from the runway while simultaneously the aircraft is positioned obliquely relative to the runway. In this way, it is possible, in accordance with the invention to limit the arrangement of the previously designated openings for the purpose of blowing in air under pressure on the inlet side of the interior of the lip of the shroud in its lower peripheral region.

It is also possible to provide the means which have been described in accordance with FIGS. 1, 2 and 3 in combinations in such a turbine engine.

Figure 4:
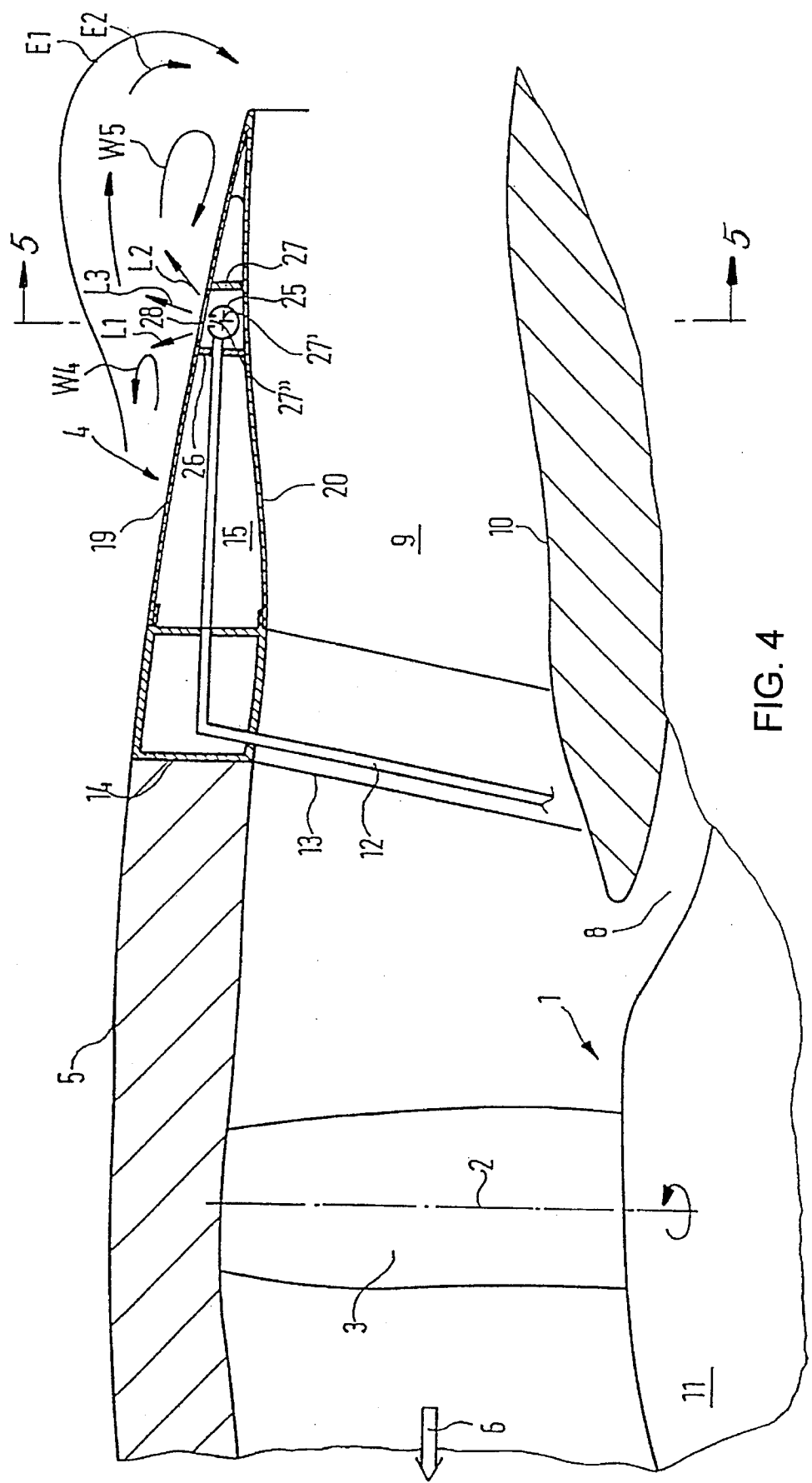
FIG. 4 shows a modification of FIG. 1 in such a way that an adjustable annular line system is provided at the rear end of the shroud for a variable direction of outward flow of the air under pressure.
Figure 5:
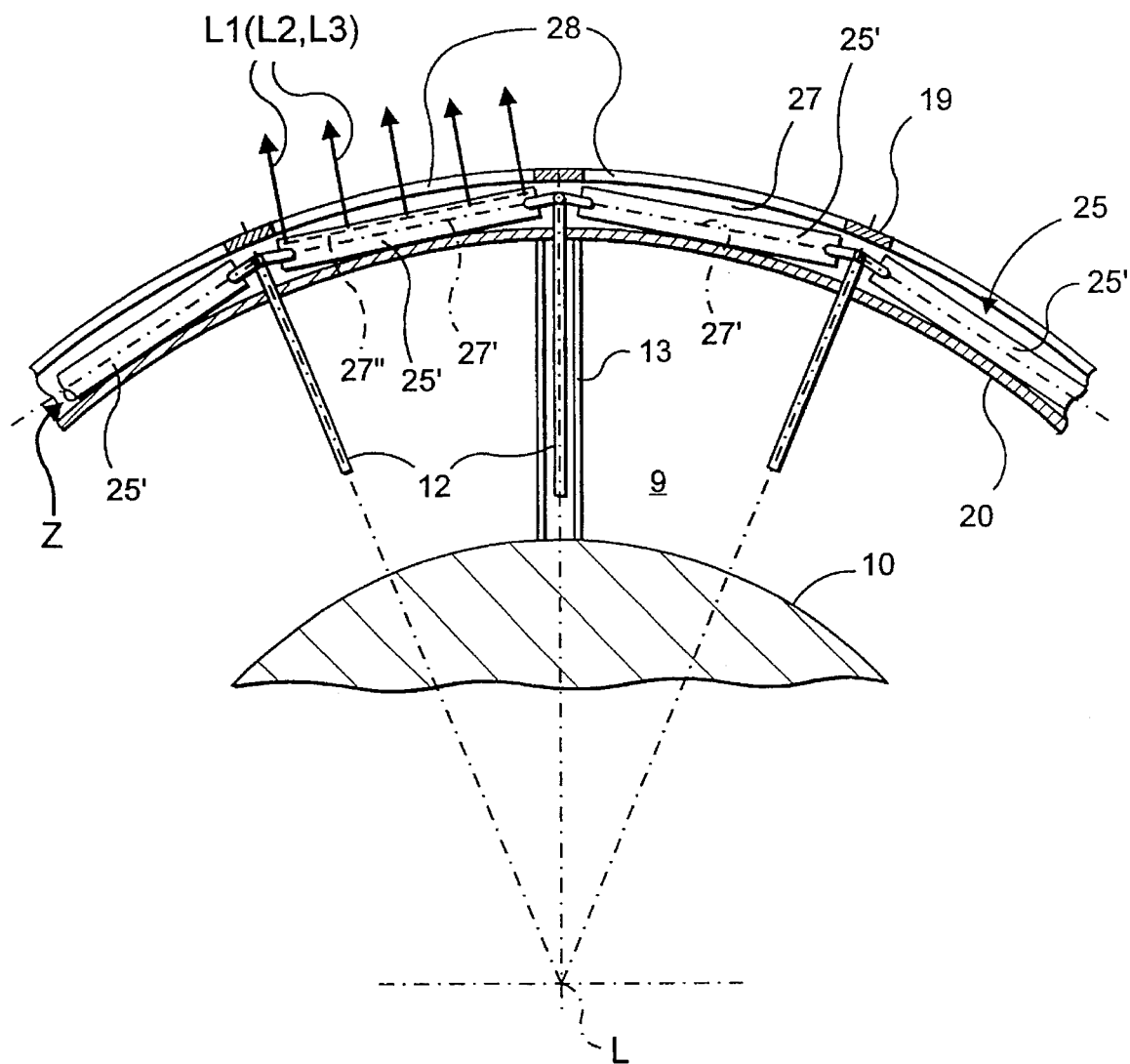
FIG. 5 is a section taken on line 5—5 in FIG. 4 over a portion of the periphery of the shroud.

In accordance with FIG. 4, a further modification of the embodiment in accordance with FIGS. 1 and 2 is described for variably blowing out air under pressure with regard to the indicated flow directions L1, L2, L3. For this purpose, chamber 15 in the rear end 4 of the shroud contains an annular duct means 25, which is subdivided into a plurality of straight sections 25' which extend around the periphery of the shroud; the sections 25' of the annular duct means 25 are each mounted in a manner which permits pivoting about a longitudinal axis of rotation 27' extending transversely with respect to the axis of the engine or with respect to the axis of the fan. The annular duct means 25 is isolated in the chamber 15 by means of radial partitions 26, 27. The discharge line 12 for air under pressure extends through one partition 26 to the annular duct means 25. The discharge line 12 can expediently be connected to the annular duct means 25 at a location at which a rotation bearing is formed for a section of the duct means. In addition, the annular duct means 25 has longitudinal slits 27" for blowing out air under pressure; subsidiary slit openings 28 with a larger length or width, are arranged in the outer wall 19 of the rear end 4 so that blowing out of air under pressure, which is angularly adjustable and variable in accordance with the operating criteria, is possible between L1 and L2. In the embodiment in accordance with FIG. 4, increase in thickness and rounding of the air flow is achieved purely aerodynamically on the surface by moderately blowing air out under pressure at L3 hence causing a progressing turbulent field W4, W5; this leads to a turbulent-free flow of air E1 and E2 around the rear edge of the shroud without the disadvantages produced by the pointed and slender tip of the end 4 of the shroud which is unfavorable for such thrust reversal modes of operation but which is favorable for normal flight modes of operation.

While mastering the critical cases which were mentioned at the beginning and in order to achieve a configuration, especially of the respective front and rear ends 21, 4 of the shroud, which is extremely slender, low in resistance and optimum in terms of fuel consumption for normal flight operation, the possibility exists of undertaking the sucking in of boundary layer air through the openings, e.g. 22, 23, and 24 (FIG. 3) or, 16, 17 and 18 (FIG. 2), which is present at the ends 21 and 4 of the shroud, with the prerequisite that, instead of a high pressure in accordance with the air under pressure which is, for example, taken out of the high pressure compressor, a relatively low suction pressure is applied through discharge line 12 or 12' at a value lower than the static pressure of the surrounding air which prevails at the front end 21 or as the case may be, at the rear end 4 of the shroud.

What is claimed is:

1. A turbofan engine having an engine and a fan and comprising a shroud surrounding the engine and defining therewith a secondary channel containing said fan for flow of air therethrough from front to rear during normal forward flight to produce forward thrust and from rear to front during braking to produce reverse thrust, said fan having blades with variable pitch for reversing the flow of air through said secondary channel, said shroud having a leading end with an inlet lip thereat and a trailing end of pointed shape forming a part of a nozzle for discharge of air during forward flight, said leading end and said trailing end having a fixedly arranged contour to produce an airflow pattern thereon corresponding to aerodynamic flow requirements during cruise flight operating conditions and means at least at one of said ends of said shroud for changing said air flow pattern at said at least one of said shroud ends during engine operating conditions differing from said cruise flight operating conditions for diverting, from outer ambient air flow, a partial intake air flow into said shroud to produce a substantially smooth, non-turbulent flow of the complete engine intake air into said shroud at said at least one end thereof, wherein said means for changing said air flow pattern comprises means for blowing air under pressure at the outside surface of said shroud.

2. A turbofan engine as claimed in claim 1, wherein said shroud at said at least one end has a plurality of openings at said outside surface through which said air is blown.

3. A turbofan engine as claimed in claim 1, wherein said means for diverting partial intake air flow from outer ambient air includes a chamber in said at least one end of said shroud, said chamber being in communication with said openings, and means for supplying air under pressure into said chamber.

4. A turbojet engine as claimed in claim 2, wherein said means for supplying air under pressure into said chamber comprises a discharge line for receiving air under pressure from the engine, said discharge line communicating with said chamber.

5. A turbofan engine as claimed in claim 2, wherein said openings are arranged longitudinally along said outer surface at different inclinations to produce a symmetrical, turbulent flow of the air under pressure on said outer surface of the shroud which diverts said partial intake air flow from the ambient air flow on said outer surface so that said partial intake air flow and thus the complete intake air flows into the shroud in said substantially, smooth, non-turbulent state.

6. A turbojet engine as claimed in claim 5, wherein said at least one end of the shroud is said trailing end, said trailing end having an inner surface provided with respective openings therein for flow of air under pressure into said shroud.

7. A turbojet engine as claimed in claim 6, wherein said openings in the inner surface of the shroud are inclined forwardly to produce a turbulent flow of the air under pressure blowing therefrom at said inner surface and assist in induction of intake air into the trailing end of the shroud during braking and maintain the substantially smooth, non-turbulent state of the complete intake air.

8. A turbofan engine as claimed in claim 2, wherein said means for diverting partial intake air flow from outer ambient air includes a chamber in said at least one end of said shroud, said chamber being in communication with said openings, and means for supplying air under pressure into said chamber.

9. A turbojet engine as claimed in claim 8, wherein said means for supplying air under pressure into said chamber comprises a discharge line for receiving air under pressure from the engine, said discharge line communicating with said chamber.

10. A turbofan engine as claimed in claim 9, wherein said discharge line extends through a fixed support blade extending through said secondary channel.

11. A turbofan engine as claimed in claim 10, wherein said means for supplying air under pressure into said chamber further comprises an annular duct means in said chamber, said annular duct means having an air outlet which opens into said chamber, said annular duct means being connected to said discharge line and being constructed and arranged to adjust a direction of discharge air from said outlet into said chamber and thereby adjust the direction of flow of the air under pressure passing through said openings in the outer surface of said shroud.

12. A turbofan engine as claimed in claim 11, comprising valve means in said discharge line for controlling flow of air therefrom.

13. A turbofan engine as claimed in claim 1, wherein said means for blowing air at the outside surface of the shroud is located at the trailing end of said shroud and is constructed to produce, during reverse thrust, a ring of air around said shroud in which, in a plane passing through an axis of rotation of the fan, the air circulates annularly in a clockwise direction.

14. A turbofan engine as claimed in claim 1, wherein said means for blowing air at the outside surface of the shroud is constructed for producing on an inner surface of said trailing end of said shroud, during reverse thrust, a ring of air on and within said shroud in which in a plane passing through the axis of rotation of the fan, the air circulates annularly in a clockwise direction.

15. A method of controlling the flow of intake air into a turbofan engine having a shroud surrounding the engine to form a passageway therewith in which a fan is disposed to produce forward thrust during normal, forward flight and reverse thrust during braking, said shroud being formed with an inlet lip at a leading edge of a forward end portion of the shroud and with a pointed trailing edge at a rearward end portion of the shroud which forms a nozzle of aerodynamic profile for the discharge of fan air during normal, forward flight, said method comprising forming a turbulent flow of air on an external surface of the shroud at least at one of said end portions to produce a substantially smooth non-turbulent flow of ambient intake air into said passageway at said at least one end portion of the shroud and wherein said turbulent flow of air is formed by blowing air out under pressure at said external surface of the shroud in proximity to the corresponding leading or trailing edge of said at least one end portion of the shroud.

16. A method as claimed in claim 15, comprising blowing the air out under pressure at an outer surface of said rearward end portion of the shroud.

17. A method as claimed in claim 16, comprising effecting the blowing of the air out under pressure at different angles along the outer surface of said rearward end portion of the shroud.

18. A method as claimed in claim 16, further comprising blowing the air out under pressure at an inner surface of said rearward end portion of the shroud.

19. A method as claimed in claim 15, comprising blowing the air out under pressure at an outer surface of said forward end portion of the shroud.

20. A turbofan engine as claimed in claim 13, further comprising an annular intake channel for flow of air from said secondary channel to said engine, said secondary channel extending rearwardly of said annular intake channel between said trailing end of said shroud and said engine, said means for blowing air under pressure comprising at least one discharge line receiving air under pressure from a compressor of the engine, said means for diverting partial intake air flow from the ambient air flow comprising a chamber in said at least one end of said shroud communicating with said openings, said at least one discharge line passing through a hollow support blade in said secondary channel and communicating with said chamber.

21. A method as claimed in claim 15, wherein said forming of a turbulent flow of air on an external surface of the shroud is achieved by diverting from ambient air flow on the outer surface of the shroud, a portion thereof which enters said at least one end portion of said shroud in a smooth non-turbulent flow causing substantially all the ambient intake air flow to be smooth and non-turbulent.

22. A turbofan engine as claimed in claim 11, wherein said annular duct means comprises a plurality of straight sections in an annular arrangement in said chamber, each section being provided with a respective air outlet and being rotatable about a respective longitudinal axis to vary the direction of discharge air into said chamber.

* * * * *